United States Patent
Jensen

(10) Patent No.: US 6,503,402 B2
(45) Date of Patent: Jan. 7, 2003

(54) SYSTEM AND METHOD FOR TREATING IRRIGATION WATER

(75) Inventor: Lonald H. Jensen, Las Vegas, NV (US)

(73) Assignee: Nytrox !, Inc., Las Vegas, NV (US)

( * ) Notice: Subject to any disclaimer, the term of this patent is extended or adjusted under 35 U.S.C. 154(b) by 115 days.

(21) Appl. No.: 09/734,359

(22) Filed: Dec. 12, 2000

(65) Prior Publication Data

US 2002/0070180 A1 Jun. 13, 2002

(51) Int. Cl.[7] .................................................. C02F 1/78
(52) U.S. Cl. ....................... 210/748; 210/760; 210/192; 210/198.1; 422/186.12; 422/186.14; 422/186.19; 422/186.2
(58) Field of Search ................................. 210/748, 760, 210/192, 198.1; 422/186.07, 186.12, 186.14, 186.18, 186.19, 186.2

(56) References Cited

U.S. PATENT DOCUMENTS

| | | | |
|---|---|---|---|
| 4,159,971 A | * | 7/1979 | Gneupel |
| 4,954,321 A | * | 9/1990 | Jensen |
| 5,316,639 A | * | 5/1994 | Okazaki et al. |
| 5,370,846 A | * | 12/1994 | Yokomi et al. |
| 6,022,456 A | * | 2/2000 | Manning |

* cited by examiner

*Primary Examiner*—Betsey Morrison Hoey
(74) *Attorney, Agent, or Firm*—Jeffrey Weiss; Harry M. Weiss; Weiss, Moy & Harris, P.C.

(57) ABSTRACT

A system and method for treating water to be used for irrigation. The system and method utilizes an apparatus for generating ozone and other atoms and molecules resulting from the bombardment of a feed gas with electrons has, preferably, a first electrode positioned within a channel in a second electrode. The first electrode is a substantially sealed tube made of dielectric material, having at least one electron gun positioned proximate an end thereof for firing electrons into the first electrode. In electrical communication with the electron gun is a rod, maintained in a tube also made of dielectric material, which acts to maintain a constant energy level through the length of the rod and thus the length of the electrode. Within the first electrode is an inert gas which, upon the firing of the electron gun, is formed into a plasma. When a feed gas (generally air) is passed between the first and second electrodes, the electrons and plasma cause the formation of ozone and other atoms and molecules in the feed gas, which products have beneficial uses in the treatment of water and air for different purposes. The treated feed gas is then injected, preferably with a venturi type of injector, into the water to be treated.

57 Claims, 5 Drawing Sheets

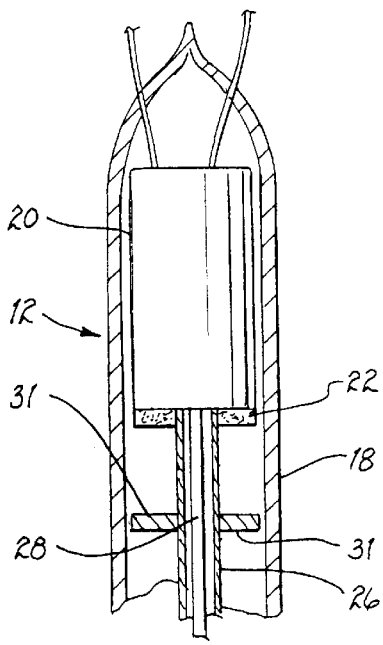
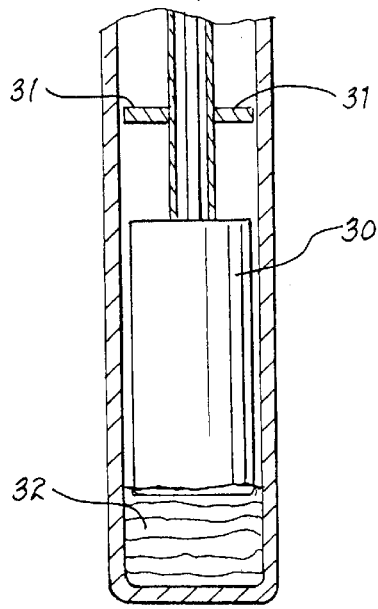
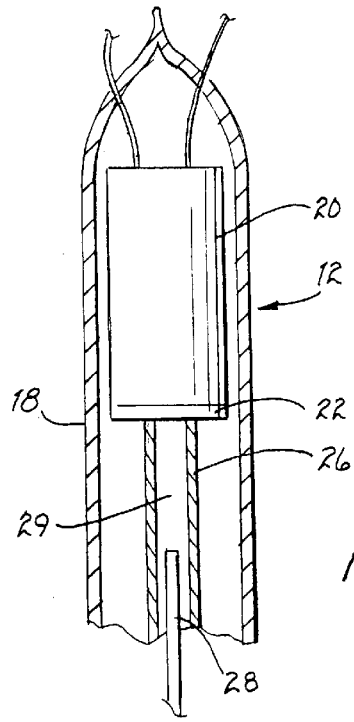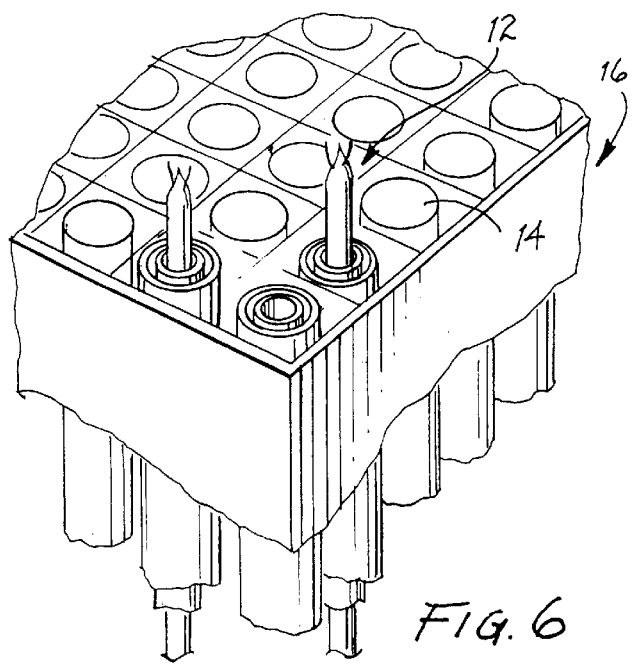
FIG. 4
FIG. 5
FIG. 6

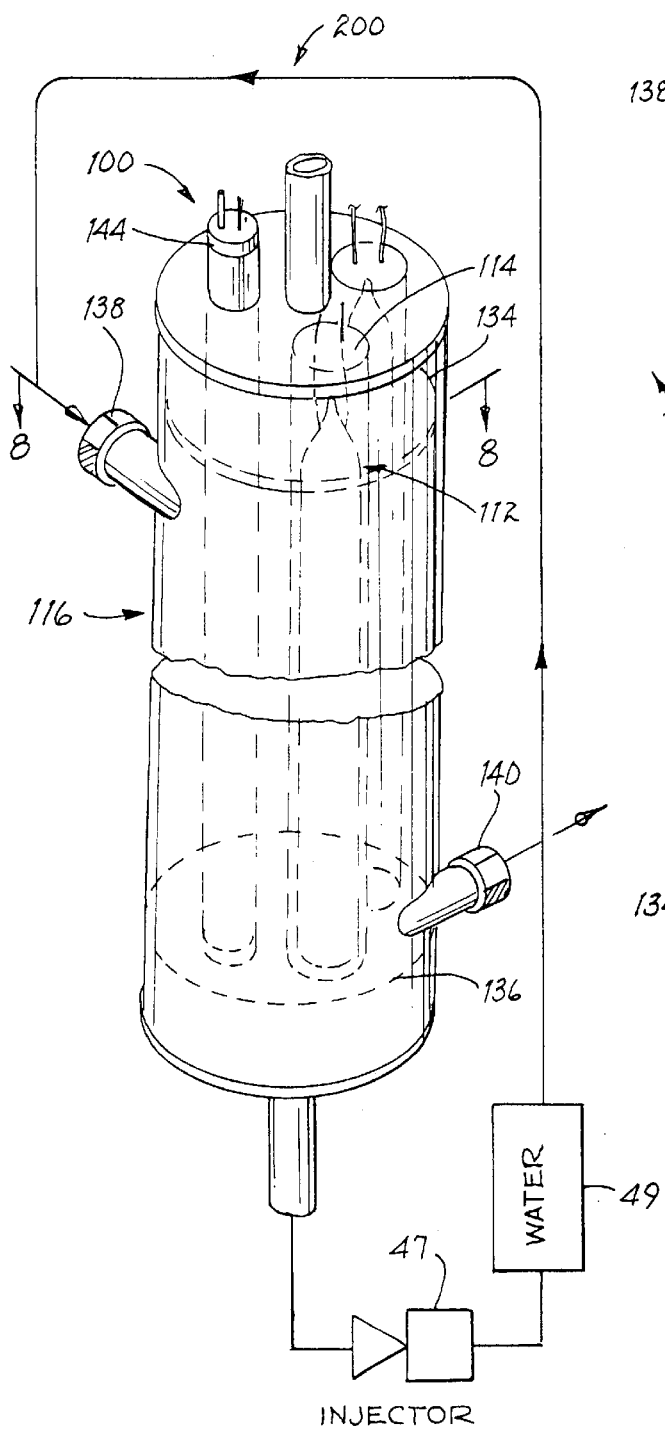
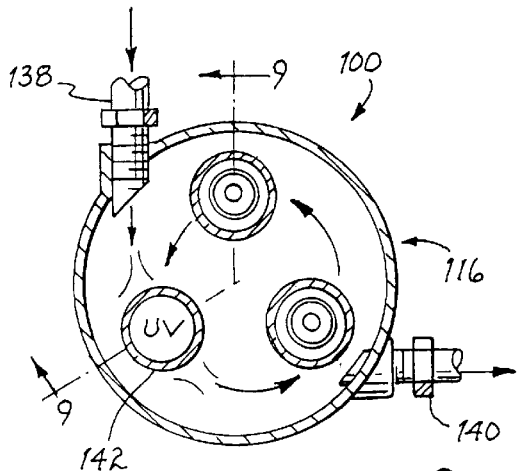
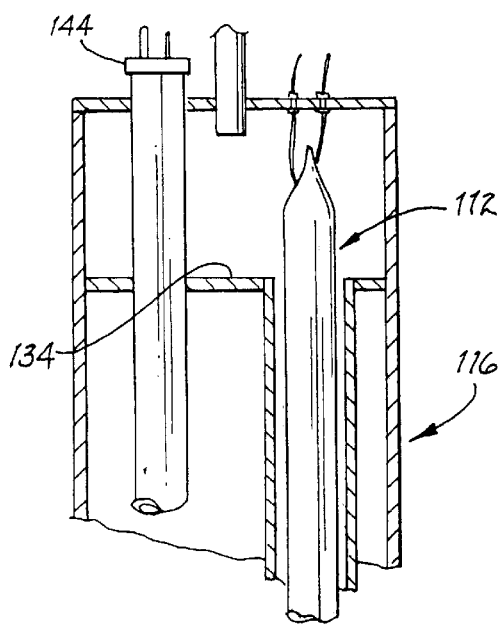
FIG. 7
FIG. 8
FIG. 9

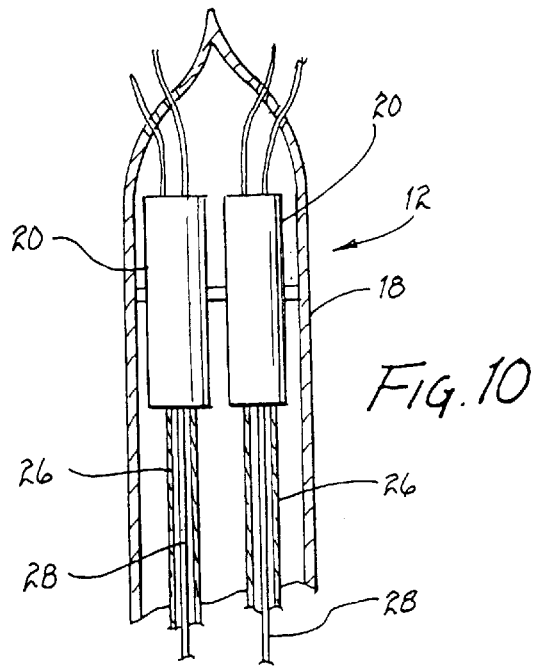
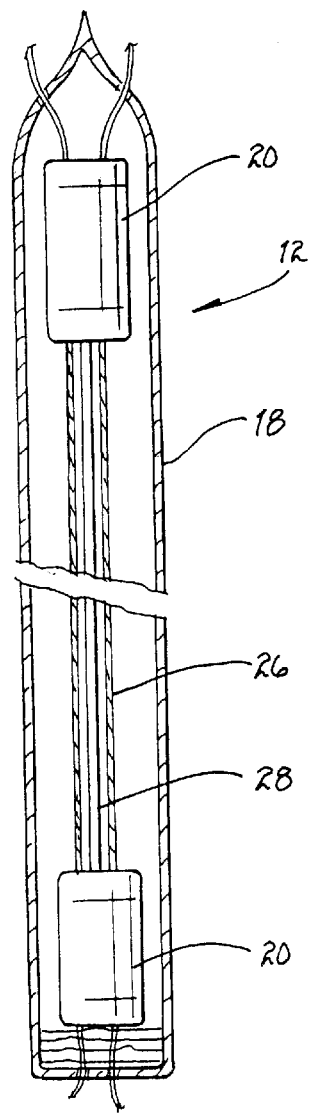
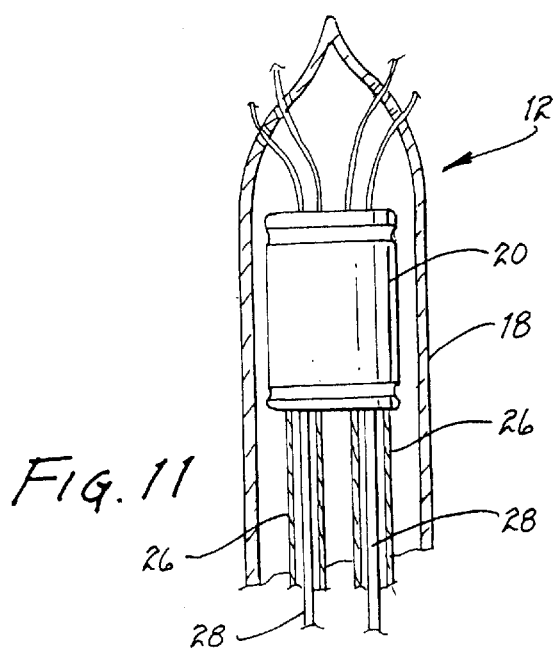
FIG. 10
FIG. 11
FIG. 12

A FEED GAS IS OZONATED
USING AN OZONE GENERATION
APPARATUS OF THE TYPE
DISCLOSED HEREIN

THE OZONATED FEED GAS IS
INJECTED INTO THE WATER TO BE
TREATED

THE TREATED WATER IS
USED FOR IRRIGATION

Fig. 13

SYSTEM AND METHOD FOR TREATING IRRIGATION WATER

CROSS-REFERENCE TO RELATED APPLICATIONS

The contents of the following U.S. Patent Applications are hereby incorporated by reference: U.S. patent application Ser. No. 09/738,030, filed Dec. 18, 2000 and entitled "Apparatus and Method for Treating Drinking Water"; U.S. patent application Ser. No. 09/734,750, filed Dec. 12, 2000 and entitled "Apparatus and Method for Generating Ozone"; U.S. patent application Ser. No. 09/734,369, filed Dec. 12, 2000 and entitled "Apparatus and Method for Treating Waste Water"; U.S. patent application Ser. No. 09/735,031, filed Dec. 12, 2000 and entitled "Apparatus and Method for Preserving Stored Foods"; and U.S. patent application Ser. No. 09/734,368, filed Dec. 12, 2000 and entitled "Apparatus and Method for Treating Cooling Tower Water."

BACKGROUND OF THE INVENTION

1. Field of Invention

This invention relates generally to systems and methods for treating irrigation water and, more specifically, to a system and method for treating irrigation water utilizing a high concentration ozone generation apparatus.

2. Background of the Invention

The use of ozone, an unstable molecule comprised of three atoms of oxygen ($O_3$) having a high oxidation potential, to purify water and air is well known. It was used to purify drinking water by the latter part of the 1800's, and today is used for this purpose by most major U.S. cities. Ozone has also been utilized for the purification of other types of water, including irrigation water, as well as waste water and cooling tower water. Still further, ozone has been used for purifying the air in food storage facilities going back at least as far as 1909.

The basic principles underlying the use of ozone generation are well established. Clean, dry air consists of approximately 78 percent nitrogen gas ($N_2$), approximately 21 percent oxygen gas ($O_2$), and less than one percent of hydrogen ($H_2$) and other gasses. When air (referred to as the "feed gas" in this context) is irradiated using either an ultraviolet source or corona discharge (the acceleration of electrons between two electrodes, separated by a dielectric material, to collide with a feed gas passed therebetween), some of the $O_2$ molecules are split to form two short-lived oxygen atoms. These oxygen atoms combine, almost instantaneously, with uncleaved oxygen molecules to form ozone. Ozone is not the only product of what is generally referred to herein as an ozonation process; i.e., the irradiation of a feed gas to create ozone and other new compounds. The bombarding of the feed gas with electrons causes the all of the component gasses—and not just the oxygen to rearrange—forming a number of beneficial molecular combinations in addition to ozone. These rearranged molecules include nitrates, nitrites, nitrogen oxides, nitric acid, nitrogen based acids, hydrogen peroxide, hydroperoxide, and hydroxyl radicals ($NO$, $NO_2$, $NO_3$, $N_2O$, $N_2O_5$, $HNO_2$, $HNO_3$, $O$, $H$, $OH$, $HO_2$, $H_2O_2$).

Ozone and certain of the other atoms and molecules formed as a result of ozonation (including hydrogen peroxide and hydroxyl radicals) have a number of beneficial uses in the areas of disinfection and odor elimination—and are useful in the treatment of irrigation water, as well as drinking water, waste water, cooling tower water, stored foods, etc. Certain of the nitrogen containing molecules produced as result of this process, including in particular nitrates and nitric acid, can be used beneficially to treat irrigation water and to thereby act as a fertilizer and assist plant growth.

Ultraviolet radiation is disfavored as a method for generating ozone, due to the inability to produce high quantities of ozone at a relatively low cost in this fashion. As a result, most commercial ozone production is accomplished using a corona discharge type of ozone generator.

However, there are numerous problems with prior art corona discharge ozone generators, and thus limitations on their suitability for use in a system and method for treating irrigation water. Thus, when the feed gas is passed between the electrodes, water or dust present in the feed gas attach themselves to the dielectric surrounding the cathode. These spots tend to attract electrons, with the result that hot spots are formed on the surface of the dielectric—leading eventually to the burning through of the dielectric and consequent failure of the generation apparatus. In the commercial area, ozone generators require constant servicing and, indeed, rebuilding, because of such problems. In the City of Los Angeles, for example, high concentration ozone generators used to treat the city,s drinking water are presently required to be rebuilt after approximately ten days of use—a rate that is plainly undesirable. Moreover, prior art devices do not permit the ready manipulation of the ozonation products, for example to produce more ozone and less nitrogen-containing compounds or more nitrogen-containing products and less ozone. This type of manipulation is particularly desired in a system and method for treating irrigation water.

U.S. Pat. No. 4,954,321, issued to the applicant herein, illustrates a plasma corona discharge apparatus, representing an improvement upon the basic corona discharge process. Generally, a plasma corona discharge apparatus is similar to a non-plasma apparatus, except that in a plasma apparatus, an inert gas is inserted into an elongated, insulated, sealed cathode, into which electrons are fired for the ozonation process. That gas performs two functions. First, it generally precludes the formation of hot spots and resulting dielectric burn-through and generator failure through a convection process. In this regard, the inert gas, which has become a plasma by virtue of the electrons passing therethrough, becomes attracted to a water or dust spot, the gas becomes heated and then rises away from the hot spot, to be replaced by gas having a lower temperature. This results in a relatively constant movement of the gas and substantially reduces overheating and/or apparatus failure attributable to the formation of stable hot spots.

The second function of the inert gas is to directly assist in the efficiency of the ozonation process. In this regard, upon the firing of electrons from an electron gun into the inert gas, a plasma is formed within the cathode (i.e., on the inside of the dielectric), and also outside of the dielectric. The passage of electrons though this plasma and into the feed gas causes oxygen disassociation and reformation as ozone at an improved rate over non-plasma devices.

However, even the plasma device illustrated in U.S. Pat. No. 4,954,321, while more reliable than prior art devices, suffers from important limitations and deficiencies. For example, the energy produced by the electron gun firing into the cathode is concentrated near the electron gun, and gradually dissipates over the length of the electrode. This results in a decrease in the effectiveness of this particular prior art apparatus in treating the feed gas, and thus in the production of a lower concentration of ozone than is possible if the energy level could be maintained constant throughout the length of the cathode.

A need therefore existed for an improved system and method for treating irrigation water, based on an ozone generator apparatus and method capable of reliably generating high concentrations of ozone (and other ozonation products) suitable for use in such treatment. The improved system and method should provide for the maintenance of a relatively constant energy level throughout the length of the energy-producing electrode, so as to provide more efficient production of ozonation products. The improved system and method should also provide for the efficient adjustment of the products of ozonation, so that ozone or nitrogen-containing products can be favored. The present invention satisfies these needs and provides other, related, advantages.

SUMMARY OF THE INVENTION

It is an object of the present invention to provide an improved system and method for treating irrigation water with ozone and other atoms and molecules formed from the bombardment of a feed gas with electrons.

It is an object of this invention to provide an improved system and method for treating irrigation water with ozone and other atoms and molecules formed from the bombardment of a feed gas with electrons, wherein the system and method have a reduced risk of failure as compared to prior art systems and method based on corona discharge apparatuses.

It is a further object of this invention to provide an improved system and method for treating irrigation water with ozone and other atoms and molecules formed from the bombardment of a feed gas with electrons capable of producing a higher concentration of ozone than prior art systems and methods based on corona discharge apparatuses by, among other things, providing for a substantially constant energy level throughout the length of the first electrode in the apparatus used in the system and method of the present invention.

It is a still further object of this invention to provide an improved system and method for treating irrigation water with ozone and other atoms and molecules formed from the bombardment of a feed gas with electrons which system and method may be readily adjusted to alter the relative quantities of atoms and molecules produced from the bombardment, so as to optionally produce more nitrogen containing compounds for use as a fertilizer.

BRIEF DESCRIPTION OF THE PREFERRED EMBODIMENTS

In accordance with one embodiment of the present invention, a system for treating water to be used for irrigation is disclosed. The system comprises, in combination: an apparatus for bombarding a feed gas with electrons to generate ozone and other atoms and molecules comprising: a first electrode; wherein the first electrode comprises: an electron gun coupled to a power source and located proximate one end of the first electrode; a rod in electrical communication with the electron gun; a first tube of dielectric material disposed along a length of the rod; a second tube of dielectric material dimensioned to receive therein the first tube; wherein the second tube is substantially sealed; and an inert gas disposed within each of the first tube and the second tube; a second electrode containing a channel dimensioned to receive therein the first electrode so that sufficient space is present between the first electrode and the second electrode that a feed gas may be passed through the channel along an exterior surface of the first electrode; a feed gas inlet coupled to the second electrode and wherein the feed gas inlet is in communication with the channel; a feed gas outlet coupled at a first end thereof to the second electrode and wherein the feed gas outlet is in communication with the channel; and an injector coupled to the feed gas outlet.

In accordance with another embodiment of the present invention, a system for treating water to be used for irrigation is disclosed. The system comprises, in combination: an apparatus for bombarding a feed gas with electrons to generate ozone and other atoms and molecules comprising: a first electrode comprising a substantially sealed tube of dielectric material; wherein the first electrode further comprises: a first electron gun coupled to a power source, located proximate one end of the first electrode, and adapted to fire electrons into the substantially sealed tube of dielectric material; a second electron gun coupled to a power source, located proximate a second end of the first electrode, and adapted to fire electrons into the substantially sealed tube of dielectric material; and an inert gas disposed within the substantially sealed tube of dielectric material; a second electrode containing a channel dimensioned to receive therein the first electrode so that sufficient space is present between the first electrode and the second electrode that a feed gas may be passed through the channel along an exterior surface of the first electrode; a feed gas inlet coupled to the second electrode and wherein the feed gas inlet is in communication with the channel; a feed gas outlet coupled at a first end thereof to the second electrode and wherein the feed gas outlet is in communication with the channel; and an injector coupled to the feed gas outlet.

In accordance with still another embodiment of the present invention, a method for treating water to be used for irrigation is disclosed. The method comprises the steps of: providing an apparatus for bombarding a feed gas with electrons to generate ozone and other atoms and molecules comprising: a first electrode; wherein the first electrode comprises: an electron gun coupled to a power source and located proximate one end of the first electrode; a rod in electrical communication with the electron gun; a first tube of dielectric material disposed along a length of the rod; a second tube of dielectric material dimensioned to receive therein the first tube; wherein the second tube is substantially sealed; and an inert gas disposed within each of the first tube and the second tube; a second electrode containing a channel dimensioned to receive therein the first electrode so that sufficient space is present between the first electrode and the second electrode that a feed gas may be passed through the channel along an exterior surface of the first electrode; a feed gas inlet coupled to the second electrode and wherein the feed gas inlet is in communication with the channel; and a feed gas outlet coupled at a first end thereof to the second electrode and wherein the feed gas outlet is in communication with the channel; providing an injector coupled to the feed gas outlet; providing power from the power source to the electron gun; passing a feed gas into the feed gas inlet, through the channel, and out of the feed gas outlet; and injecting the feed gas passing out of the feed gas outlet into water to be used for irrigation.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 4 is a side cross-sectional view of the first electrode in an embodiment of an ozone generation apparatus utilized in the system and method of the present invention, illustrating a configuration in which there is no gap between the rod and the electron gun.

FIG. 5 is a side cross-sectional view of the first electrode in an embodiment of an ozone generation apparatus utilized in the system and method of the present invention, illustrating a configuration in which there is a gap between the rod and the electron gun.

FIG. 6 is a perspective view of another embodiment of an ozone generation apparatus utilized in the system and method of the present invention, illustrating a configuration having numerous first electrodes.

FIG. 7 is a perspective, cut-away view of another embodiment of the apparatus utilized in the system and method of the present invention, having an ultraviolet light source.

FIG. 8 is a top, cross-sectional view of the apparatus of FIG. 7, taken along line 8—8.

FIG. 9 is a side view of the apparatus of FIG. 7, taken along line 9—9 of FIG. 8.

FIG. 10 is a side view of another embodiment of an electrode in the apparatus utilized in the system and method of the present invention, illustrating a plurality of electron guns.

FIG. 11 is a side view of another embodiment of an electrode in the apparatus utilized in the system and method of the present invention, illustrating an electron gun having a plurality of rods therein.

FIG. 12 is a side view of another embodiment of an electrode in the apparatus utilized in the system and method of the present invention, in which an electron gun is positioned on both ends of the electrode.

FIG. 13 is a flow chart showing the system and method of the present invention.

DETAILED DESCRIPTION OF THE PREFERRED EMBODIMENTS

Figure 1:
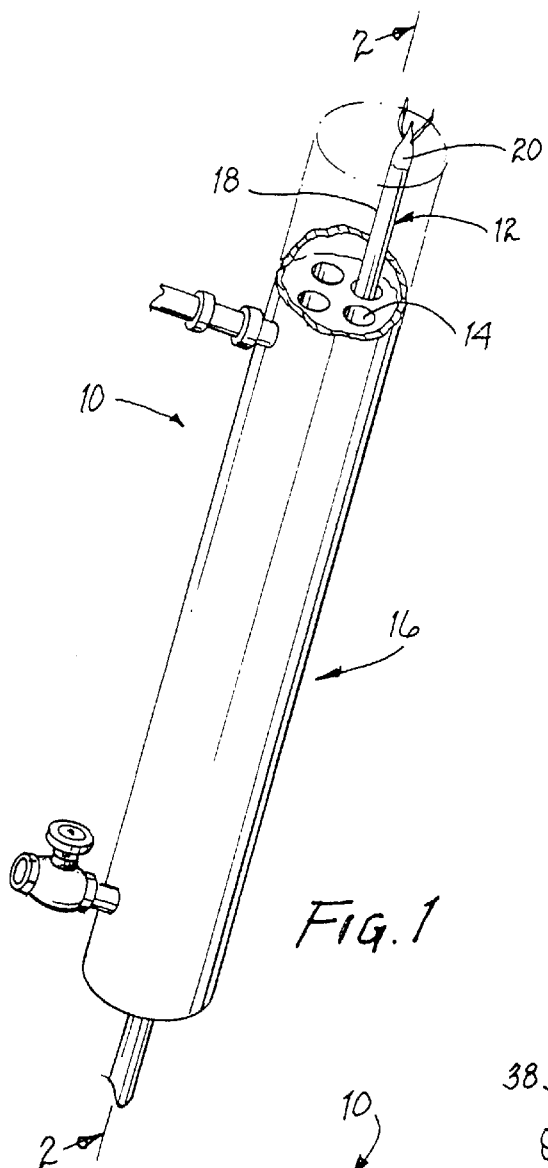
FIG. 1 is a perspective view of one embodiment of an ozone generation apparatus utilized in the system and method of the present invention.
Figure 3:
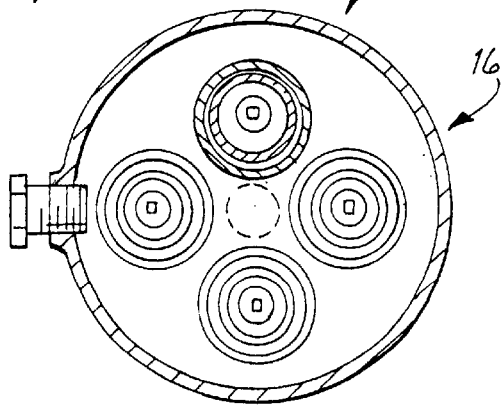
FIG. 3 is a top cross-sectional view of the apparatus of FIG. 1, taken along line 3—3 of FIG. 2.

With regard to the treatment of irrigation water, two potential purposes are present. First, if the water to be used for irrigation is contaminated and/or malodorous, it is desired to disinfect that water and to remove the odors. Second, irrigation water can potentially serve as a carrier for nitrates and other compounds potentially useful for fertilization, and a treatment process that puts such compounds into irrigation water is beneficial.

Turning first to disinfection and odor removal, ozone, an electron deficient molecule, is a very powerful oxidizing agent (i.e., a chemical species that gains electrons during a chemical reaction.) The oxidation potential of ozone follows only that of flourine, atomic oxygen and hydroxyl radicals, and substantially exceeds that of chlorine, a chemical widely used in water treatment. (Flourine and atomic oxygen are not routinely used as oxidants. While hydroxyl radicals are also not routinely put to such use, they are not—unlike Flourine, for example—unduly dangerous for such use and a process that creates sufficient hydroxyl radicals for use in a treatment process would be highly beneficial.) Thus, ozone has been shown to have greater ability to kill microbiological contaminants than hypochlorous acid and hyporchlorite ion, the two forms of chlorine in water at typical pH values. Indeed, ozone has been shown to be able to disinfect water containing cystic material—e.g., *Giardia lamblia*—which is unaffected by chlorine.

Ozone has been shown to be superior to chlorine in the treatment of non-microbiological contaminants as well. In this regard, the superior oxidization potential of ozone allows it to react quickly and completely with all but the most stable contaminants. Thus, ozone has been shown to eliminate color, odor, and tastes in water by destroying the causative substances—including phenols, sulfur compounds, and many heavy metals (including iron, manganese, lead, zinc, cadmium, and nickel). Under appropriate conditions, ozone has been shown capable of reacting with extremely toxic halogenated aromatic organic compounds, including polychlorinated or brominated biphenyls (PCB's), the herbicide 2,4,5,-T, the pesticide hystachlor, and halogenated organic compounds.

Ozone possesses other qualities that can make it preferable to chlorine and other chemicals commonly used in water treatment processes. First, ozone does not affect the pH of the water that it is used to treat. As a result, the use of ozone in a water treatment process will not tend to make the treated water any more corrosive or scale causing—unlike chlorine and other treatment chemicals. Relatedly, ozone completely oxidizes metal surfaces—such as those commonly present in a water treatment facility, providing a covering surface that protects the metal from further rusting or corroding. In comparison, chlorine, for example, can have a significant corrosive effect on metal surfaces.

Another advantage possessed by ozone versus chlorine and other chemicals used in water treatment is that it does not lead to the formation of any undesirable reaction byproducts, with any unused ozone quickly reverting back to oxygen gas ($O_2$). The undesirable reaction byproducts of other treatment chemicals, such as the chlorides produced when chlorine is used as an oxidant in a wet scrubber, are potentially harmful to the environment. Other undesirable reaction byproducts produced when other chemicals are used in a treatment process may require subsequent disposal—a step not required when ozone is employed.

Still further advantages associated with ozone versus other treatment chemicals include that ozonation generally requires a shorter reaction time than other treatment chemicals. Ozone is highly water soluble—approximately ten times more than oxygen gas—and yet because of its highly unstable nature quickly reverts back to oxygen. Thus, the ozone will quickly enter the water to be treated, react, and revert back to oxygen. As a result, a treatment process involving ozonation is generally faster than a treatment process involving other treatment chemicals such as chlorine.

Unlike most chemicals used for water treatment, including particularly chlorine, ozone cannot be packaged or stored. It decomposes relatively quickly in dry air and even more rapidly in solution. Therefore, ozone that is to be used in water or other treatment processes must be generated on site and used immediately. This can be both a disadvantage and an advantage. On the one hand, the use of ozonation requires the maintenance of an ozone generation capability at the water treatment site, something not required with other treatments. On the other hand, the need to transport potentially dangerous chemicals and the risks associated with such transportation are eliminated.

Where the water that is desired to be used for irrigation is waste water that is to be recycled, one of the most significant problems encountered is that of eliminating odors. One common method of treating such water involves the removal of odors by adsorption, in which activated carbon, molecular sieves, ion exchange media, desiccants and combinations thereof are used to trap odors. At the end of this process, the saturated sorbent must be disposed in a landfill, incinerated, or regenerated.

Another method of treating waste water to eliminate odors includes the use of a treating liquid having a pleasing odor more powerful than the offending odor, with the pleasing odor being more pungent than the malodor. However, because this process does not involve a chemical reaction, the treating liquid has a tendency to separate from the malodor. Another method involves the addition of polymers to the waste water, to cause coagulation of the treated water—leading to the formation of a solid product that may be incinerated or disposed of in some other fashion. Yet another method involves the wet scrubbing of the malodorous air stream produced by the waste water with chlorine or other reagents, resulting in the oxidation of certain of the contaminants. Still other methods include a variety of chemical processes and incineration.

Ozone has been shown to be extremely effective at the elimination of odors found in waste water. These odors can be caused by, among other things, phenols, sulfur compounds, mercaptans, amines, aldehydes, aromatic hydrocarbons, and many heavy metals (including iron, manganese, lead, zinc, cadmium, and nickel). Odor molecules are electron rich, and ozone acts to eliminate the odors produced by these odor molecules through an oxidation-reduction reaction. In particular, an oxygen atom from the three atom ozone molecule will bind to the electron rich odor molecule and saturate its excess electron sites. This neutralizes odor intensity and causes the ozone molecule to be reduced to oxygen gas.

The ozonation process has a number of advantages over prior art processes. It is not a masking process, and thus there is no concern about separation or the like that may result in a dissipation in the odor removal effect over time. Also, the result of the reaction is environmentally safe oxygen, and there is no need to dispose of a potentially harmful reaction byproduct. These factors can, among other things, make waste water more readily recyclable, in particular for irrigation. Ozonation as a method of treating waste water can be used alone or in combination with one or more other treatment methods (and/or the ozonation treatment can be performed more than one time) to achieve optimal results.

Certain of the other products of the corona discharge process, including hydrogen peroxide and hydroxyl radicals, are also oxidizing agents and supplement the oxidative effect of ozone on molecules present in the treated water.

As discussed above, the improved corona discharge process of the present invention also produces in the feed gas a number of nitrogen containing molecules. These molecules, as well as ozone and certain of the other products of the corona discharge/plasma process, can be used beneficially to assist plant growth.

A number of factors influence the growth of plants. These include the porosity of the soil, water, the salinity of the soil, and the amount of fixed nitrogen available. Treating first the porosity of the soil, this factor affects the movement of moisture and air through the soil, and is in turn greatly influenced by the soil structure. Soil structure is a function of the soil's pH and the ability of the soil to exchange ionic chemicals.

Soil particles generally carry a net negative charge, with the result that positively charged ions (cations) can be attracted to and held by these soil particles. Calcium ($Ca^{++}$) and ammonium ($NH_4^+$) are important cations involved in plant growth. Soils with a high percentage of exchangeable calcium ions are more porous and therefore more easily crumbled and easier to till. These qualities also make it easier for water to penetrate the soil and reach the plant root. Thus, soils with higher ionic exchange capacities are typically more fertile than other soils.

Water is also essential to plant growth. It is involved in photosynthesis and is also necessary to plant cell formation. It also serves to carry food and mineral elements to the soil, and dissolves many inorganic and organic constituents in soil, making them available to the living inhabitants.

The salt content of soil also affects its suitability for plant growth. Soil having an unduly high salt content will not support plant growth, and each year land must be pulled from plant production because its salt content has become too high. Increased salinity is frequently caused by irrigation of land overlying salty groundwater, with the irrigation causing the water table to rise and thus pushing salt into the topsoil. One example of this is the once fertile Indus Valley of Pakistan, the largest irrigated region in the world, much of the land of which has now been rendered unsuitable for growth because of excess salt.

Fixed nitrogen is a primary plant nutrient and is generally the limiting nutrient in plant growth. Nitrogen makes up part of the chlorophyll molecule that is required for photosynthesis, and is also needed in protein synthesis. Plants tend to use nitrate as their source for nitrogen, although ammonium may also be utilized. Plants obtain nitrogen from nitrogen-fixing bacteria (e.g., Cyanobacteria), or where this is insufficient, it is necessary to add fertilizer. Fertilizer can come in dry or liquid forms. The disadvantages associated with fertilizers include that they can be harmful to those coming in contact with them (or with those consuming the produce of the plant exposed to them), and can cause corrosion of storage vessels, pipelines, valves, and fittings used in irrigation.

The ozonation of irrigation water can be beneficial to plant growth in each of these areas. First, treating the issue of soil porosity and water supply, the nitric acid, nitrous acid, and oxalic acid that is produced in the treated water change calcium carbonate present in the water to bicarbonate, which is up to 2,000 times more soluble in water. (The oxalic acid is produced by the oxidation of organics present in the treated water by ozone and hydrogen peroxide, while the nitric and nitrous acids are direct products of the treatment of the feed gas using the apparatus of the present invention.) The increased solubility of bicarbonate over calcium carbonate make the water more penetrating and the soil more porous—improving plant growth.

With respect to soil salinity, the bicarbonate present in the treated water will become involved in a cation exchange with soil salts, with calcium ions replacing sodium ions and thereby lowering the salt content of the soil.

Turning to the apparatus 10 to be used for treating water to be used for irrigation, it comprises, generally, at least one and preferably a plurality of electrodes 12 maintained in channels 14 within an anode 16. The electrodes 12, in turn, comprise an outer sealed tube 18, made of a dielectric material and substantially hermetically sealed. The material of the outer sealed tube 18 is preferably leaded glass or pyrex, although other dielectric materials could be used without departing from the spirit or scope of the present invention. At an upper portion of the outer sealed tube 18 is positioned an electron gun 20. The electron gun 20 may be of any desired size and of any type having the desired output. Preferably, the electron gun 20 is of the Philips TC series, and preferably is a Philips T19C, having a diameter of 19 mm. The Philips TC series is preferred for the electron gun 20 because of the presence at a bottom portion thereof of a ceramic ring 22, which ceramic ring 22 is able to better withstand the significant heat or sputtering created at the bottom portion of the electron gun 20 during operation of the apparatus 10—heat that otherwise could be sufficient to cause damage to the electron gun 20 through sputtering over time.

Each electron gun 20 is coupled to a power source 24. The power source may have any desired voltage consistent with the use to which the apparatus 10 is to be placed. Generally, the power source 24 should have a voltage of at least 1,000 volts, with a voltage of 10,250 preferred. During operation, and because the electrode 12 acts as a capacitor when electricity is passed therethrough, secondary voltage discharges in the range of approximately 100,000 volts are produced. Because of the occurrence of such secondary discharges, the power source 24 should be non-current limited so as to prevent failure during the occurrence of a secondary discharge.

Referring specifically to FIGS. 4–5, inserted into the electron gun 20 is an inner tube 26, also made of a dielectric material. Like the outer sealed tube 18, the inner tube 26 is preferably made of leaded glass or pyrex, although other dielectric materials could be used without departing from the spirit or scope of the present invention. Positioned within the inner tube 26 is a rod 28. The rod 28 can be made of any metal, including aluminum, stainless steel or tungsten. Superior results have been obtained with aluminum. In one embodiment, the rod 28 extends into the electron gun 20. In the preferred embodiment, a gap 29 is created between the rod 28 and the electron gun 20. The purpose of the gap 29 is to create an increase in voltage from the power source 24—potentially more than a ten-fold increase—when the electricity jumps from the electron gun 20 to the rod 28. This increase in voltage results in an increase in the number of electrons generated and thus increases the efficiency of the ozonation process. Gaps of one-half inch and one inch have been shown to produce good results, although gaps of other lengths would be possible. Whether or not the gap 29 is present, the rod 28 maintains a substantially constant level of energy throughout its length.

It should be noted that while the electron gun 20 is preferably positioned within the outer sealed tube 18 at an upper portion thereof, it would be possible, without departing from the spirit or scope of the present invention, to position the electron gun 20 outside of the outer sealed tube 18. In such a configuration, the rod 28 and inner tube 26 would extend through a sealed opening in the outer sealed tube 18 so as to receive a flow of electrons from the electron gun 20. Moreover, and referring specifically to FIG. 12, while a single electron gun 20 positioned at a top portion of the electrode 12 is preferred, it would be possible to position an electrode 12 at a bottom portion of the electrode 12 at the other end of the rod 28—either in place of or in addition to the electron gun 20 positioned at the top of the electrode 12. Moreover, and referring now to FIG. 10, while a single electron gun 20 is shown in FIGS. 1, 2, 4 and 5, a plurality of electron guns 20 could be positioned at an end of the electrode 12 (or at both ends) to increase the output of the apparatus 10. (Indeed, the positioning of electron guns 20 at both ends of the electrode 12, even without the addition of the rod 28 and inner tube 26, would result in an increased yield over prior art devices.) Still further, and referring now to FIG. 11, with each electron gun 20 used, it would be possible to provide a plurality of rods 28. As shown in FIG. 11, each rod 28 could have its own inner tube 26 or, optionally, the rods 28 could be housed in a single inner tube 26.

The purpose of the inner tube 26 is prevent the creation of excess heat along the rod 28. But for the presence of the inner tube 26, heat generated by the rod 28 could burn through the outer sealed tube 18, causing the electrode 12 to fail.

The apparatus of the present invention improves upon the basic corona discharge process in a number of ways. These include the addition of the rod 28, which operates as discussed herein to allow for a substantially even amount of energy to be discharged throughout the length of the outer sealed tube 18. Without the rod 28, energy would be concentrated near the electron gun 20 and would gradually dissipate over the length of the electrode 12, reducing the effectiveness of the apparatus in treating the feed gas. Yet the addition of the rod 28 and the benefits that it confers is only made possible with the surrounding of the rod 28 with the inner tube 26—which acts to prevent the creation of excess heat along the rod 28. Still further, the use of an inert gas inside both the inner tube 26 and outer sealed tube 18, as described herein, acts as a coolant to prevent overheating of the electrode 12 during operation—substantially increasing the reliability and survivability of the apparatus 10 over prior art corona discharge ozone generators. Referring now to FIG. 4, in order to prevent the bottom of the inner tube 26 from contacting the bottom of the outer sealed tube 18 and thus causing arcing between the bottoms of the tubes 26 and 18 during operation of the electrode 12, a mini-tube 30 is preferably positioned around the bottom of the inner tube 26. The mini-tube 30, in combination with the electron gun 20, further acts to center the inner tube 26 throughout its length. (Preferably, additional centering—particularly where the electrode 12 is to be used in an angled generator—may be provided in the form of mica or other inserts 31 positioned between the inner tube 26 and the outer sealed tube 18.) The mini-tube 30 is also comprised of a dielectric material, including optionally ceramic, leaded glass, or pyrex. The mini-tube 30 is preferably open on both sides thereof. On the first side, it receives the inner tube 26. On the second side, it contacts a shock-absorber 32, which is positioned below the mini-tube 30, both to reduce the possibility of damage during movement of the electrode 12, particularly during insertion of the electrode 12 into a channel 14 in an anode 16, and to prevent the tubes 26 and 18 from contacting one another. The shock-absorbing material forming the shock-absorber 32 could be any desired material providing the desired shock-absorbing effect without interfering with the operation of the electrode 12, including for example fiberglass. It would be possible, without departing from the spirit or scope of the present invention, to eliminate the shock-absorber 32, and instead to close the second end of the mini-tube 30 so as to prevent the tubes 26 and 18 from contacting one another. As an additional alternative, it would be possible to seal the end of the inner tube 26 opposite the electron gun 20 and extend it to the bottom of the outer sealed tube 18.

Figure 2:
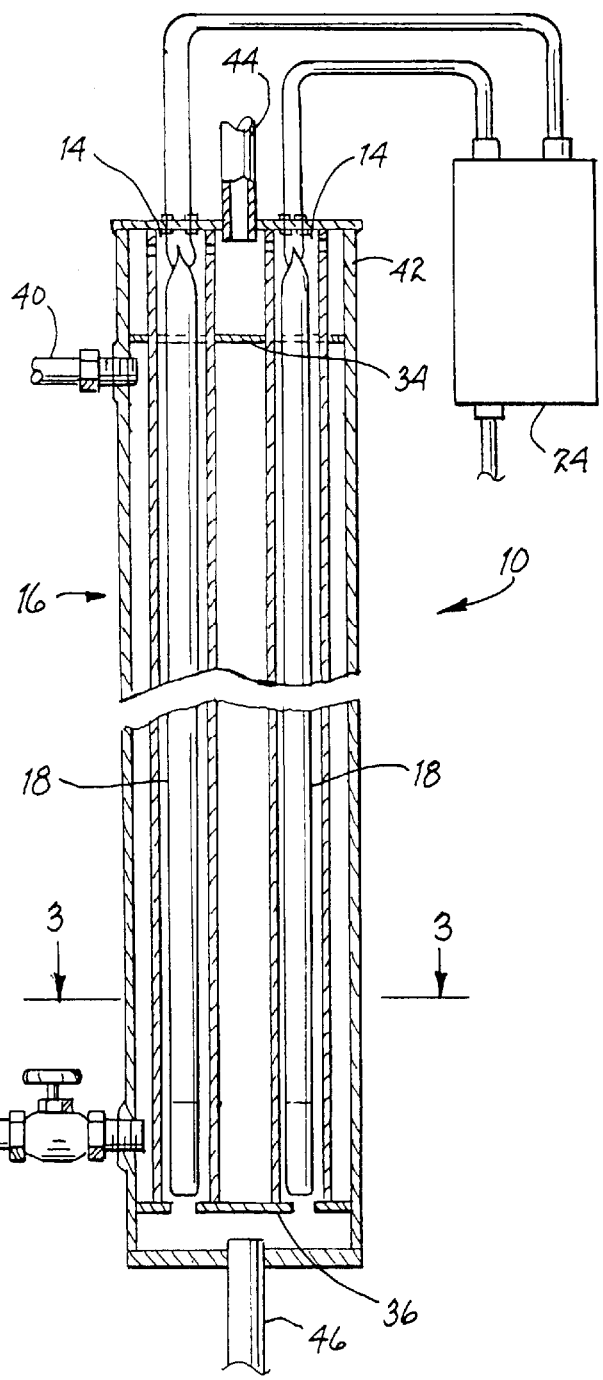
FIG. 2 is a side cross-sectional view of the apparatus of FIG. 1, taken along line 2—2.

Referring to FIG. 2, the electrode(s) 12 is dimensioned to be positioned within an anode 16, and specifically within a channel 14 in the anode 16. The channel 14 has a greater internal diameter than the external diameter of the electrode 12, so as to permit the air to be treated (the "feed gas") to pass through the channel 14 around the electrode 12. The channels 14 are positioned within the anode 16 with an upper plate 34 and a lower plate 36, so that the channels 14 open at a top portion thereof at the upper plate 34 and at a bottom portion thereof at the lower plate 36. The areas of contact between the channels 14 and the upper and lower plates 34 and 36 are preferably sealed against the passage of liquids, so as to permit the passage of a coolant between the upper and lower plates 34 and 36 and around the channels 14. The purpose of the coolant, in combination with the gasses contained in the electrodes 12 as discussed below, is to prevent overheating during operation of the electrodes 12. The coolant is preferably water—although other coolants, including for example glycol, may be used—and preferably enters the anode 16 through an inlet 38 proximate the lower plate 34 and exits the anode 16 through an outlet 40 proximate the upper plate 36.

The length of the anode 16 is preferably sufficient so that, when the electrodes 12 are positioned within the channels 14, the top, electron gun 20-containing portion of the electrode 12—which will extend above the upper plate 34—is within the outer wall 42 of the anode 16. The outer wall 42 should be of sufficient distance from the electrode 12 so as to prevent arcing between the two. A distance of approximately three inches is sufficient for certain applications.

Both the outer sealed tube 18 and the inner tube 26 have a substantially inert gas or gasses therein, including at least one noble gas. The gas acts as a coolant, by preventing through convection the overheating of the electrode 12 during operation and/or the damaging of the electrode 12 caused by electrons burning through the outer sealed tube 18. Because heated gasses will rise, the heat generated by the operation of the electrode 12 will tend to move away from a hot spot and rise along the electrode 12, until arriving at the portion of the electrode 12 positioned above the upper plate 34—an area that is maintained at a lower temperature than in the channels 14. The heated gas, which is formed into a plasma, will then cool and be replaced in this portion of the electrode 12 by hotter gasses, resulting in relatively constant movement of the gas and substantially reducing overheating and/or damaging of the electrode 12 during operation through the formation of stable hot spots.

This construction also allows the apparatus 10 of the present invention to operate at substantially higher temperatures than prior art high concentration ozone generators, without experiencing damage. (A high concentration ozone generator is generally considered to be one having an air output that contains at least approximately one percent by weight ozone.) While a typical prior art high concentration generator cannot be operated above approximately seventy-two degrees Fahrenheit, the apparatus 10 of the present invention can be operated at temperatures in the area of one hundred twenty five degrees Fahrenheit and perhaps greater without damage to the apparatus 10.

The reduction of overheating and damage to the electrode 12 provides substantial benefit over prior art high concentration ozone generators. Prior art generators have an extremely poor survival rate—requiring repair and/or rebuilding on a frequent basis. In the City of Los Angeles, for example, high concentration ozone generators used to treat the city's drinking water are required to be rebuilt approximately after only ten days of use—a rate that is plainly undesirable. The apparatus 10 of the present invention, in contrast, does not require rebuilding after short periods of use—and thus is substantially more reliable and has substantially greater survivability than prior art high concentration generators.

Located in the anode 16, above the upper plate 36, is an air inlet valve 44. Preferably a filter (not shown) is located within the inlet valve 44, so as to prevent dirt and other impurities from entering the apparatus 10. A five micron filter has been shown to be effective, but other size filters may be provided. The air need not be provided under pressure but instead, may be drawn through the system through an air outlet valve 46 located below the lower plate 34. Alternatively, the air may be provided through the air inlet valve 44 under pressure. From the air outlet valve 46, the air is transported away from the apparatus 10 and is placed into the water solution—preferably using an injector—to be treated using the apparatus 10.

During operation, power is supplied to the electron guns 20 using the power source 24. Electrons will flow from the electron guns 20 to the rod 28, passing over the gap 29 in the embodiment shown in FIG. 5. The electrons will flow down the length of the rod 28, will jump from the rod 28 to the inner tube 26, will jump from the inner tube 26 to the outer sealed tube 18, and will jump from the outer sealed tube 18 to the wall of the channel 14; i.e., to ground. The use of the rod 28 allows the for a substantially even amount of energy to be discharged throughout the length of the outer sealed tube 18. Without the rod 28, energy would be concentrated near the electron gun 20 and would gradually dissipate over the length of the electrode 12, reducing its effectiveness. The electrons passing out of the outer sealed tube 18 will act on the air passing through the channels 14, causing the air to disassociate and causing the production of a number of desirable products. These include but are not limited to nitrates, nitrites, nitrogen oxides, nitric acid, nitrogen based acids, hydrogen peroxide, hydroperoxide, ozone, and hydroxyl radicals (NO, $NO_2$, $NO_3$, $N_2O$, $N_2O_5$, $HNO_2$, $HNO_3$, O, $O_3$, H, OH, $HO_2$, $H_2O_2$). The ozonated air is then injected into water to be treated using the apparatus 10.

The types of desirable products created during the operation 10 is subject to adjustment. Thus, as discussed above, a coolant, preferably water, is passed between the upper and lower plates 34 and 36 and around the channels 14 during operation of the apparatus 10—to prevent overhearing during operation of the electrodes 12. Additionally, depending on its temperature, the coolant acts to regulate the make-up of the products produced in the air as it passes through the channels 14. Thus, by adjusting the temperature of the coolant so that the temperature of the coolant as it exits through the outlet 40 is below ninety degrees Fahrenheit, with an exit temperature in the range of approximately eighty-five degrees Fahrenheit preferred, the production of nitrates and other nitrogen containing products can be decreased and the production of ozone and hydrogen peroxide can be increased. This will be the desired mode for the treatment of drinking water. (On the other hand, by adjusting the temperature of the coolant so that the temperature of the coolant as it exits through the outlet 14 is between approximately ninety degrees and one hundred and five degrees Fahrenheit, nitrate production (and the production of other nitrogen containing compounds) can be increased and the production of ozone and hydrogen peroxide can be decreased).

The products of ozonation can be adjusted in another manner. Referring now to FIGS. 7–9, another embodiment of the apparatus 10 of the present invention—herein the apparatus 100—is shown. This embodiment involves the exposure of water injected with ozonated air to ultraviolet light at a wavelength of approximately 254 nanometers, a process that creates hydroxyl radicals in the treated water and that thus produces an oxidant that can be as much as 100,000 times more powerful than non-UV-exposed ozone. This more powerful oxidant is particularly effective in destroying man-made organic compounds, many of which have carcinogenic properties.

Referring first to FIG. 7, the apparatus 100 is shown and described. The apparatus 100 comprises at least one (and preferably at least two) electrodes 112 maintained in channels 114 within an anode 116. The channels 114 are positioned within the anode 116 with an upper plate 134 and a lower plate 136. The construction and operation of the electrodes 112, channels 114, upper plate 134 and lower plate 136, is as described above with respect to the electrodes 12, the channels 14, the upper plate 34 and the lower plate 36. With respect to the anode 116, it differs from anode 16 described above with respect to the cooling system. First, the coolant used is ozonated water (i.e., water injected with ozonated air produced by an ozone generator, such as the apparatus 100 itself), which is routed back into the anode 116 through an inlet 138 proximate the upper plate 134 and which exits the anode 116 through an outlet 140 proximate the lower plate 136. Moreover, as shown in FIG. 8, the inlet 138 is angled so that as the coolant enters the anode 116, it strikes the interior wall of the anode 116 (as opposed to, for example, directly striking a channel 114), so that the coolant swirls through the interior of the anode 116 as it proceeds toward the outlet 140.

Referring to FIGS. 7–9, the anode 116 further includes a single quartz well 142, through which an ultraviolet light source may be passed. The quartz well may be of any suitable type, including for example model GE214L manufactured by General Electric®. An ultraviolet light 144, producing ultraviolet light at a wavelength of approximately 254 nanometers, is positioned within the quartz well 142. (As shown in FIG. 7, the preferred ratio of electrodes 112 to ultraviolet lights 144 is two to one, although improved results over the prior art can be obtained from a higher or lower ratio of electrodes 112 to ultraviolet lights 144.) As the coolant (ozonated water) is swirled through the interior of the anode 116 as described above, it will be exposed to the ultraviolet light 144, causing the production of hydroxyl radicals and an increased oxidizing capability.

As shown in FIG. 7, the apparatus 100 is preferably part of a closed system 200, in which ozonated feed gas generated by the apparatus 100 is injected with an injector 47 into water 49, which ozonated water 49 is then routed back through the apparatus 100 to cool the apparatus 100 and to be exposed to ultraviolet light. Alternatively, it would be possible to provide an ozone generator that is one of the embodiments of the apparatus 10 described above, to ozonate feed gas in the manner described above, to inject that ozonated feed gas into water, and to then expose that ozonated water to a separate ultraviolet light source.

The adjustability of the apparatus 10 with respect to the components produced is of particular benefit where the apparatus 10 is to be used to treat water to be used in irrigation. For example, if there is a desire to use the irrigation water as a carrier for delivering nitrogen for fertilization—as discussed above—the apparatus 10 can be adjusted to increase the production of such components. On the other hand, if there is a desire to produce irrigation water having a higher concentration of ozone and other oxidizing agents, the apparatus 10 can be adjusted to increase the production of these components. The desire to increase the production of ozone and other oxidizers at the expense of nitrogen containing components may come from the fact that the irrigation water is to be used during a portion of the season where there is no need to fertilize, and thus there is no need for nitrogen containing components. Moreover, if the water to be used for irrigation is waste water that first needs to be disinfected and odor-treated, a feed gas rich in ozone and other oxidizers would be preferably to one with a higher nitrogen content.

Indeed, in this regard, it will sometimes be beneficial to treat water more than one time using the apparatus 10 of the present invention. For example, in the first treatment, ozone rich feed gas could be used to disinfect and odor treat the water. In the second treatment, nitrogen rich feed gas could be used to make the irrigation water a nitrogen carrier for fertilization purposes. Or, the water can be treated more than once with feed gas having the same make-up, to more efficiently impart the desired benefit. Still further, the apparatus 10 of the present invention could be used in combination with other, prior art, treatment methods.

Operation of the System

Referring now to FIG. 13, a flow chart of the system and method of the present invention is shown. The main steps of this embodiment include the ozonation of a feed gas using an ozone generator of one of the embodiments described above, the injection of the feed gas into the water to be treated, and then the use of the treated water to irrigate any land, field, grass, crops or other area requiring irrigation using any appropriate irrigation technique—including for example center pivot sprinklers, siphon tubing, pipelines, etc.

With respect to the injection of the ozonated feed gas into the water to be treated, it should be noted that the injector is preferably a venturi-type of injector, such as that produced by Mazzie®. Presently, ozone treatment of water is accomplished using large, reverse-flow atmospheric chambers. This process is relatively inefficient, and causes only about sixty percent of the ozone to be placed into solution. In contrast, a venturi-type of injector has been shown to have the ability to place in excess of ninety percent of the ozone into solution within three feet of injection.

While the invention has been particularly shown and described with reference to preferred embodiments thereof, it will be understood by those skilled in the art that the foregoing and other changes in form and details may be made therein without departing from the spirit and scope of the invention.

I claim:

1. A system for treating water to be used for irrigation comprising, in combination:
   an apparatus for bombarding a feed gas with electrons to generate ozone and other atoms and molecules comprising:
      a first electrode;
      wherein said first electrode comprises:
         an electron gun coupled to a power source and located proximate one end of said first electrode;
         a rod in electrical communication with said electron gun;
         a first tube of dielectric material disposed along a length of said rod;
         a second tube of dielectric material dimensioned to receive therein said first tube;
            wherein said second tube is substantially sealed; and
            an inert gas disposed within each of said first tube and said second tube;
      a second electrode containing a channel dimensioned to receive therein said first electrode so that sufficient space is present between said first electrode and said second electrode that a feed gas may be passed through said channel along an exterior surface of said first electrode;

a feed gas inlet coupled to said second electrode and wherein said feed gas inlet is in communication with said channel;

a feed gas outlet coupled at a first end thereof to said second electrode and wherein said feed gas outlet is in communication with said channel; and an injector coupled to said feed gas outlet.

2. The system of claim 1 wherein said power source is non-current limited.

3. The system of claim 1 wherein said electron gun further comprises a ceramic ring at an outlet portion thereof.

4. The system of claim 3 wherein said electron gun is a Philips TC series electron gun.

5. The system of claim 1 wherein said rod comprises aluminum.

6. The system of claim 1 wherein said rod comprises stainless steel.

7. The system of claim 1 wherein said rod comprises tungsten.

8. The system of claim 1 wherein said rod contacts said electron gun.

9. The system of claim 1 wherein a gap is present between said rod and said electron gun.

10. The system of claim 9 wherein said gap has a length of approximately one-half inch.

11. The system of claim 9 wherein said gap has a length of approximately one inch.

12. The system of claim 1 further comprising means for substantially centering said first tube.

13. The system of claim 12 wherein said means comprises an insulated cylinder disposed around a portion of said first tube.

14. The system of claim 13 wherein said means further comprises mica fragments contacting each of said first tube and said second tube.

15. The system of claim 12 wherein said means comprises mica fragments contacting each of said first tube and said second tube.

16. The system of claim 1 further comprising a shock absorbing material disposed below said rod at a bottom portion of said second tube.

17. The system of claim 16 wherein said shock absorbing material comprises fiberglass.

18. The system of claim 1 wherein said second electrode further comprises means for cooling said first electrode.

19. The system of claim 18 wherein said cooling means comprises:

a substantially fluid-tight chamber formed in an interior portion of said second electrode so as to permit the passage of a coolant material about a side of said channel opposite a side of said channel exposed to a flow of said feed gas;

a coolant inlet coupled to said fluid-tight chamber; and a coolant outlet coupled to said fluid-tight chamber.

20. The system of claim 1 further comprising:

an ultraviolet light source positioned within a quartz well; and means for swirling water injected with ozonated feed gas about said quartz well.

21. The system of claim 20 wherein said ultraviolet light source emits ultraviolet light a wavelength of approximately 254 nanometers.

22. The system of claim 20 wherein said quartz well is located within said second electrode.

23. The system of claim 22 wherein said second electrode further comprises means for cooling said first electrode.

24. The system of claim 23 wherein said cooling means comprises:

a substantially fluid-tight chamber formed in an interior portion of said second electrode;

a coolant inlet coupled to said substantially fluid-tight chamber and angled so as to pass water injected with ozonated feed gas in a swirling motion through said fluid-tight chamber and about said quartz well and about a side of said channel opposite a side of said channel exposed to a flow of said feed gas; and a coolant outlet coupled to said fluid-tight chamber.

25. The system of claim 23 comprising one said ultraviolet light source for each two said first electrodes.

26. The system of claim 1 wherein said first electrode further comprises a second electron gun coupled to a power source and located proximate a second end of said first electrode.

27. The system of claim 1 wherein said injector comprises a venturi-type of injector.

28. A system for treating water to be used for irrigation comprising, in combination:

an apparatus for bombarding a feed gas with electrons to generate ozone and other atoms and molecules comprising:

a first electrode comprising a substantially sealed tube of dielectric material;

wherein said first electrode further comprises:

a first electron gun coupled to a power source, located proximate one end of said first electrode, and adapted to fire electrons into said substantially sealed tube of dielectric material;

a second electron gun coupled to a power source, located proximate a second end of said first electrode, and adapted to fire electrons into said substantially sealed tube of dielectric material; and an inert gas disposed within said substantially sealed tube of dielectric material;

a second electrode containing a channel dimensioned to receive therein said first electrode so that sufficient space is present between said first electrode and said second electrode that a feed gas may be passed through said channel along an exterior surface of said first electrode;

a feed gas inlet coupled to said second electrode and wherein said feed gas inlet is in communication with said channel;

a feed gas outlet coupled at a first end thereof to said second electrode and wherein said feed gas outlet is in communication with said channel; and an injector coupled to said feed gas outlet.

29. A method for treating water to be used for irrigation comprising the steps of:

providing an apparatus for bombarding a feed gas with electrons to generate ozone and other atoms and molecules comprising:

a first electrode;

wherein said first electrode comprises:

an electron gun coupled to a power source and located proximate one end of said first electrode;

a rod in electrical communication with said electron gun;

a first tube of dielectric material disposed along a length of said rod;

a second tube of dielectric material dimensioned to receive therein said first tube;
wherein said second tube is substantially sealed; and
an inert gas disposed within each of said first tube and said second tube;
a second electrode containing a channel dimensioned to receive therein said first electrode so that sufficient space is present between said first electrode and said second electrode that a feed gas may be passed through said channel along an exterior surface of said first electrode;
a feed gas inlet coupled to said second electrode and wherein said feed gas inlet is in communication with said channel; and
a feed gas outlet coupled at a first end thereof to said second electrode and wherein said feed gas outlet is in communication with said channel;
providing an injector coupled to said feed gas outlet;
providing power from said power source to said electron gun;
passing a feed gas into said feed gas inlet, through said channel, and out of said feed gas outlet; and
injecting said feed gas passing out of said feed gas outlet into water to be used for irrigation.

30. The method of claim 29 wherein said power source is noncurrent limited.

31. The method of claim 29 wherein said electron gun further comprises the step of providing a ceramic ring at an outlet portion thereof.

32. The method of claim 31 wherein said electron gun is a Philips TC series electron gun.

33. The method of claim 29 wherein said rod comprises aluminum.

34. The method of claim 29 wherein said rod comprises stainless steel.

35. The method of claim 29 wherein said rod comprises tungsten.

36. The method of claim 29 wherein said rod contacts said electron gun.

37. The method of claim 29 wherein a gap is present between said rod and said electron gun.

38. The method of claim 37 wherein said gap has a length of approximately one-half inch.

39. The method of claim 37 wherein said gap has a length of approximately one inch.

40. The method of claim 29 further comprising means for substantially centering said first tube.

41. The method of claim 40 wherein said means comprises an insulated cylinder disposed around a portion of said first tube.

42. The method of claim 41 wherein said means further comprises mica fragments contacting each of said first tube and said second tube.

43. The method of claim 40 wherein said means comprises mica fragments contacting each of said first tube and said second tube.

44. The method of claim 29 further comprising a shock absorbing material disposed below said rod at a bottom portion of said second tube.

45. The method of claim 44 wherein said shock absorbing material comprises fiberglass.

46. The method of claim 29 wherein said second electrode further comprises means for cooling said first electrode.

47. The method of claim 46 wherein said cooling means comprises:
a substantially fluid-tight chamber formed in an interior portion of said second electrode so as to permit the passage of a coolant material about a side of said channel opposite a side of said channel exposed to a flow of said feed gas;
a coolant inlet coupled to said fluid-tight chamber; and
a coolant outlet coupled to said fluid-tight chamber.

48. The method of claim 47 further comprising the step of providing a coolant into said coolant inlet at a temperature that will result in said coolant exiting said coolant outlet at a temperature is below approximately ninety degrees Fahrenheit.

49. The method of claim 47 further comprising the step of providing a coolant into said coolant inlet at a temperature that will result in said coolant exiting said coolant outlet at a temperature in the range of approximately eighty-five degrees Fahrenheit.

50. The method of claim 47 further comprising the step of providing a coolant into said coolant inlet at a temperature that will result in said coolant exiting said coolant outlet at a temperature between approximately ninety degrees and one hundred and five degrees Fahrenheit.

51. The method of claim 29 further comprising the steps of:
providing an ultraviolet light source positioned within a quartz well; and
providing means for swirling water injected with ozonated feed gas about said quartz well.

52. The method of claim 51 wherein said ultraviolet light source emits ultraviolet light a wavelength of approximately 254 nanometers.

53. The method of claim 51 wherein said quartz well is located within said second electrode.

54. The method of claim 53 wherein said second electrode further comprises means for cooling said first electrode.

55. The method of claim 54 wherein said cooling means comprises:
a substantially fluid-tight chamber formed in an interior portion of said second electrode;
a coolant inlet coupled to said substantially fluid-tight chamber and angled so as to pass water injected with ozonated feed gas in a swirling motion through said fluid-tight chamber and about said quartz well and about a side of said channel opposite a side of said channel exposed to a flow of said feed gas; and
a coolant outlet coupled to said fluid-tight chamber.

56. The method of claim 54 comprising one said ultraviolet light source for each two said first electrodes.

57. The method of claim 29 wherein said first electrode further comprises a second electron gun proximate a second end of said first electrode.

* * * * *